United States Patent
Usui et al.

(10) Patent No.: US 8,233,695 B2
(45) Date of Patent: Jul. 31, 2012

(54) GENERATING IMAGE INSPECTION DATA FROM SUBTRACTED CORNER-PROCESSED DESIGN DATA

(75) Inventors: Satoshi Usui, Kanagawa-ken (JP); Hideki Kanai, Kanagawa-ken (JP); Koji Hashimoto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 986 days.

(21) Appl. No.: 11/956,087

(22) Filed: Dec. 13, 2007

(65) Prior Publication Data
US 2008/0144920 A1 Jun. 19, 2008

(30) Foreign Application Priority Data
Dec. 13, 2006 (JP) .................................. 2006-336091

(51) Int. Cl.
*G06K 9/00* (2006.01)
*G03F 1/00* (2012.01)
(52) U.S. Cl. ........................................... 382/144; 430/5
(58) Field of Classification Search .................... 382/144
See application file for complete search history.

(56) References Cited

U.S. PATENT DOCUMENTS

| | | | | |
|---|---|---|---|---|
| 5,475,766 A | * | 12/1995 | Tsuchiya et al. | 382/144 |
| 6,449,386 B1 | * | 9/2002 | Nakao | 382/144 |
| 6,451,490 B1 | * | 9/2002 | Advocate et al. | 430/5 |
| 6,622,547 B1 | * | 9/2003 | Phan et al. | 73/105 |
| 6,631,511 B2 | * | 10/2003 | Haffner et al. | 716/52 |
| 6,993,455 B2 | * | 1/2006 | Koehle et al. | 702/182 |
| 7,141,338 B2 | * | 11/2006 | Chen et al. | 430/5 |
| 2002/0081500 A1 | * | 6/2002 | Cobb et al. | 430/5 |
| 2005/0014074 A1 | * | 1/2005 | Liebmann et al. | 430/5 |
| 2005/0025351 A1 | | 2/2005 | Kotani et al. | |
| 2006/0210887 A1 | * | 9/2006 | Henkel et al. | 430/5 |

FOREIGN PATENT DOCUMENTS

JP 2005-026360 1/2005

* cited by examiner

*Primary Examiner* — David Zarka
(74) *Attorney, Agent, or Firm* — Oblon, Spivak, McClelland, Maier & Neustadt, L.L.P.

(57) ABSTRACT

A method of generating an inspection data used for inspecting an inspection-object pattern on a substrate, the inspection-object pattern formed by transferring a first mask pattern formed on a first mask and a second mask pattern formed on a second mask onto one layer on the substrate, a part of a first transferred pattern of the first mask pattern and a part of a second transferred pattern of the second mask pattern being overlapped on the layer. The method performs a corner process on each corner of a first design data of the first mask pattern and each corner of a second design data of the second mask pattern and generates an inspection data by performing a logical operation using the corner-processed first design data and the corner processed second design data.

8 Claims, 4 Drawing Sheets

GENERATING IMAGE INSPECTION DATA FROM SUBTRACTED CORNER-PROCESSED DESIGN DATA

CROSS-REFERENCE TO RELATED APPLICATIONS

This application is based upon and claims the benefit of priority from prior Japanese Patent Application No. 2006-336091, filed Dec. 13, 2006, the entire contents of which are incorporated herein by reference.

BACKGROUND OF THE INVENTION

1. Field of the Invention

The present invention relates to a method of generating an inspection data used in the inspection of a pattern formed on a substrate, an inspection method using the inspection data, and a computer readable storage medium.

2. Description of the Background Art

In recent years, a demand for micropatterning semiconductor integrated circuits has been increasing. In this trend, it is becoming increasingly difficult to inspect defects of a pattern (a device pattern) formed on a semiconductor substrate (wafer). As a result, the Die to Database inspection method has been mainly used rather than the Die to Die inspection method as the inspection method for defect inspection of a device pattern. The Die to Database inspection method is disclosed for example in Jpn. Pat. Appln. KOKAI Publication No. 2005-26360.

In the Die to Database inspection method, the defects of the device pattern are detected with desired detection sensitivity by comparing the inspection data to the device pattern. In the inspection method, it is very important to apply an appropriate inspection data for obtaining an accurate result.

However, in the background Die to Database inspection method, an appropriate inspection data is not always used and thereby a reliable inspection result can not always be obtained.

SUMMARY OF THE INVENTION

According to an aspect of the invention, a method of generating an inspection data is executed, and the generated inspection data is used for inspecting an inspection-object pattern on a substrate, the inspection-object pattern formed by transferring a first mask pattern formed on a first mask and a second mask pattern formed on a second mask onto one layer on the substrate, a part of a first transferred pattern of the first mask pattern and a part of a second transferred pattern of the second mask pattern being overlapped on the layer. The method comprises: performing a corner process on each corner of a first design data of the first mask pattern to generate first corner-processed design data, and performing a corner process on each corner of a second design data of the second mask pattern to generate second corner-processed design data; and generating an inspection data by performing a logical operation using the first corner-processed design data and the second corner-processed design data.

According to another aspect of the invention, an inspection method of an inspection-object pattern comprises forming an inspection-object pattern on a substrate by transferring a first mask pattern formed on a first mask and a second mask pattern formed on a second mask on one layer on the substrate, a part of a first transferred pattern of the first mask pattern and a part of a second transferred pattern of the second mask pattern being overlapped on the layer; performing a corner process on each corner of a first design data of the first mask pattern to generate first corner-processed design data, and performing a corner process on each corner of a second design data of the second mask pattern to generate second corner-processed design data; generating an inspection data by performing a logical operation using the first corner-processed design data and the second corner-processed design data; and comparing the inspection data to the inspection-object pattern.

According to another aspect of the invention, a computer readable storage medium stores instructions of a computer program that causes a computer to perform a method of generating inspection data used to inspect an inspection-object pattern on a substrate, the inspection-object pattern formed by transferring a first mask pattern formed on a first mask and a second mask pattern formed on a second mask on one layer on the substrate, a part of a first transferred pattern of the first mask pattern and a part of a second transferred pattern of the second mask pattern being overlapped on the layer. The computer performed method comprises performing a corner process on each corner of a first design data of the first mask pattern to generate first corner-processed design data, and performing a corner process on each corner of a second design data of the second mask pattern to generate second corner-processed design data; and generating an inspection data by performing a logical operation using the first corner-processed design data and the second corner-processed design data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

An embodiment of the present invention will be described below with reference to the accompanying drawings.

Figure 1:
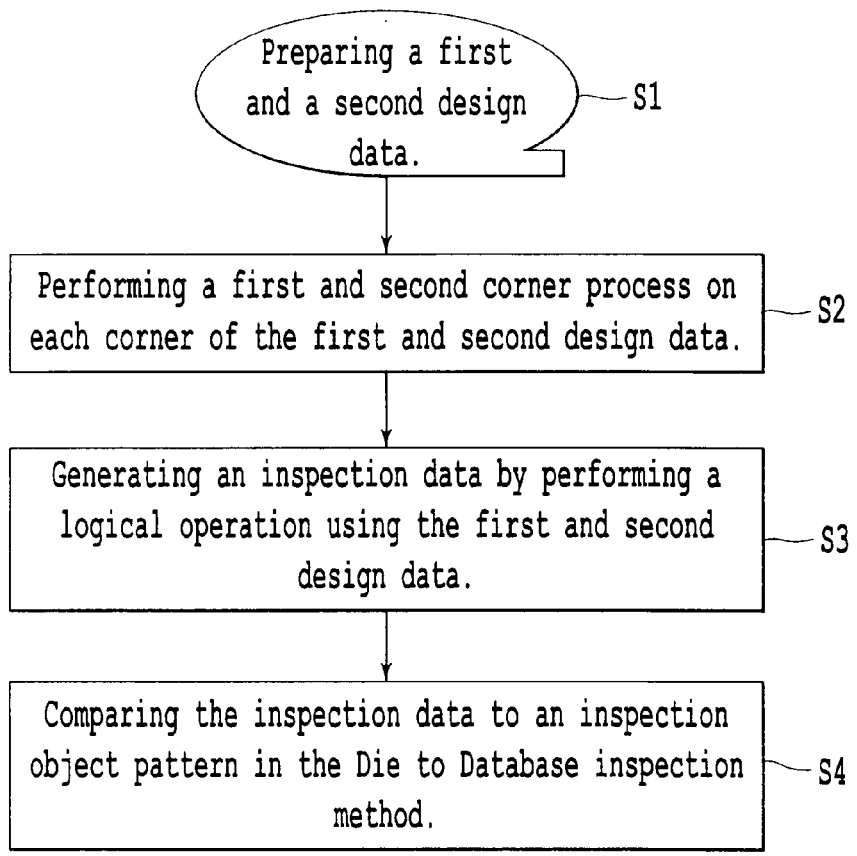
FIG. 1 is a flowchart showing a procedure of a method of generating an inspection data and an inspection method comparing an inspection data to a device pattern formed on a substrate according to an embodiment of the present invention.

FIG. 1 is a flowchart showing a procedure of a method of generating an inspection data and an inspection method according to an embodiment of the present invention.

Figure 2:
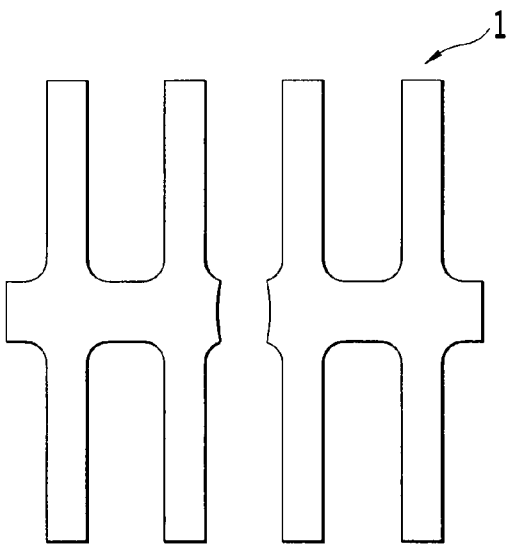
FIG. 2 is a plan view showing a device pattern (an inspection-object pattern) formed on a substrate by double exposure according to an embodiment of the present invention.

In this embodiment, as an example, an inspection data is generated based on design data of mask patterns formed on photomasks. The photomasks are exposed by double exposure and the mask patterns are transferred onto a substrate for forming a device pattern (for example a gate pattern). FIG. 2 is a plan view showing a gate pattern 1, as an example of an inspection-object pattern, formed on a substrate by double exposure. The gate pattern 1 is one of wiring components in a logic circuit. The width of the gate pattern 1 is, for example, less than or equal to 65 nm of a node.

According to the embodiment, a first mask pattern of a first photomask exposed in a first exposure and a second mask pattern of a second photomask exposed in a second exposure are transferred on the same layer on the substrate. In the double exposure, apart of a first transferred pattern of the first mask pattern and a part of a second transferred pattern of the second mask pattern are overlapped on the same layer with each other. After the double exposure, through development process and etching process, the gate pattern 1 is formed on the substrate.

The present invention is directed to generating inspection data to determine whether the gate pattern 1 is properly formed on the substrate. In forming the gate pattern 1 on a substrate, due to a proximity effect from a write exposure when transferring the different photomasks, corner portions of the gate pattern 1 become rounded, as shown in FIG. 2. Therefore, in the present invention, for the inspection data to accurately determine whether the gate pattern 1 is properly formed on the substrate, the inspection data is subject to a corner rounding process so that it more accurately matches the gate pattern 1 as actually formed on the substrate.

Thereby, according to the embodiment of the present invention, inspection data is also subject to a corner rounding process, as now discussed below.

As shown in FIG. 1, a first design data of the first mask pattern and a second design data of the second mask pattern are prepared (step S1). The first design data and the second design data correspond to the first mask pattern and the second mask pattern.

Figure 3:
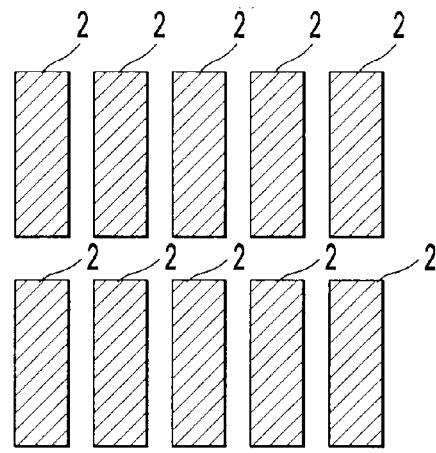
FIG. 3 is a plan view showing a first design data of a mask pattern (a first mask pattern) exposed in a first exposure according to an embodiment of the present invention.

FIG. 3 is a plan view showing the first design data. In FIG. 3, shaded rectangle regions 2 in the first design data correspond to light transmitting regions in the first mask pattern. Whether the dimension of the first mask pattern is accurate or not effects the shape and the width of the gate pattern 1. Therefore, an alternating phase shift mask is preferably used as the first photomask.

Figure 4:
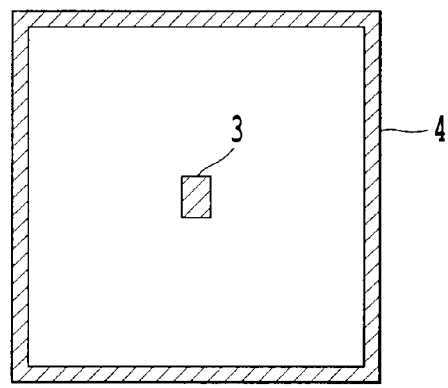
FIG. 4 is a plan view showing a second design data based on a mask pattern (a second mask pattern) exposed in a second exposure according to an embodiment of the present invention.

FIG. 4 is a plan view showing the second design data. In FIG. 4, shaded rectangle region 3 and outer frame region 4 in the second design data correspond to light transmitting regions of the second mask pattern, and the other region in the second design data corresponds to a light shielding region of the second mask pattern. Accuracy of dimensions of the second photomask has less of an effect on the shape and the width of the gate pattern 1 than that of the first photomask. Therefore, a chromium mask or an attenuated phase shift mask is preferably used as the second photomask. The chromium mask has a light transmitting region comprised of glass and a light shielding region comprised of chrome.

As discussed above, when a refined and rectangle mask pattern is transferred onto a substrate, corner shapes of the transferred pattern are likely to be rounded. Thereby, the inspection data in the present invention should consider such rounded corner portions and should also be rounded to match the transferred pattern on the substrate. In this embodiment, to represent the rounded corner shapes of the inspection-object pattern formed on the substrate by transferring the mask patterns, a corner rounding process is performed on each corner of the first design data (a first corner process) and the second design data (a second corner process) (step S2 in FIG. 1). The inspection data is generated based on the corner-processed design patterns. An amount of the corner rounding process may be determined respectively for each corner of the first design data and the second design data. Thereby, an appropriate amount of the corner rounding process can be applied respectively on each corner of the first and second design data.

Figure 5:
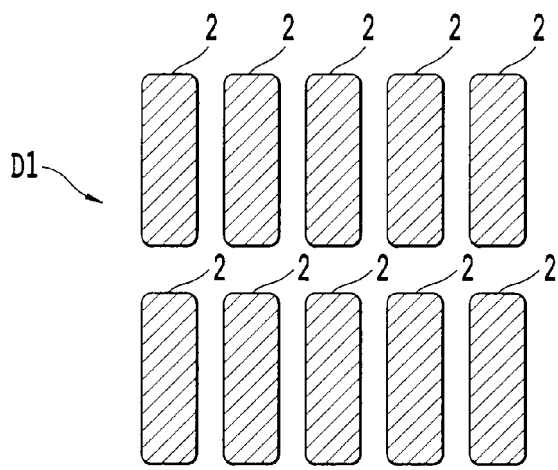
FIG. 5 is a plan view showing the first design data, on each corner of which a first corner rounding process is performed, according to an embodiment of the present invention.

FIG. 5 is a plan view showing the first corner-processed design data (D1), which on each corner of the first corner a rounding process has been performed. As shown in FIG. 5, in the first corner rounding process, the four outer corners of each shaded rectangle region 2 are rounded (an outer corner rounding process).

Figure 6:
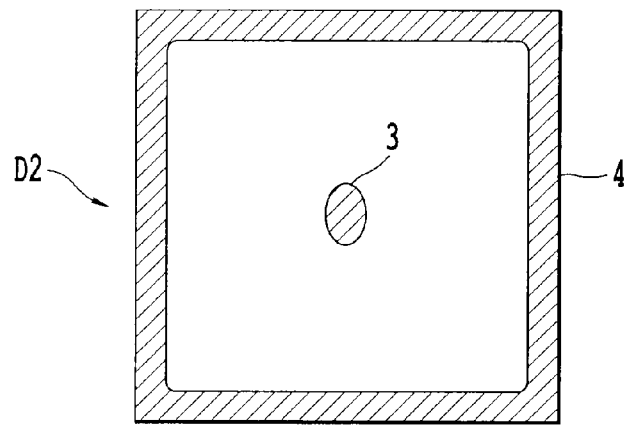
FIG. 6 is a plan view showing a second design data, on each corner of which a second corner rounding process is performed, according to an embodiment of the present invention.

FIG. 6 is a plan view showing the second corner-processed design data (D2), on each corner of which a second corner rounding process has been performed. As shown in FIG. 6, in the second corner rounding process, the four outer corners of each shaded rectangle region 3 and the four inner corners of the outer frame region 4 are rounded.

Figure 7:
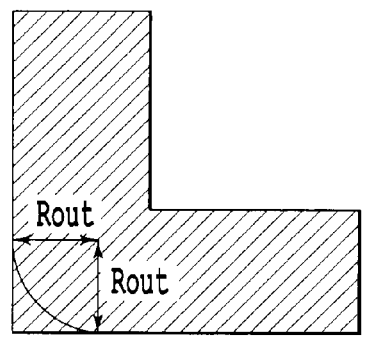
FIG. 7 is a schematic view explaining curvature radius, based on which an amount of an outer corner process performed on an outer corner of a design data is determined, according to an embodiment of the present invention.
Figure 8:
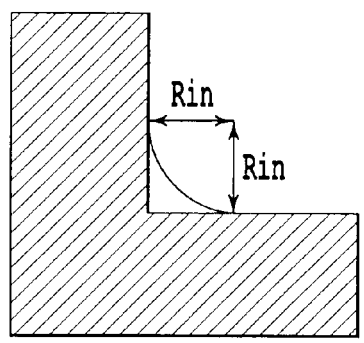
FIG. 8 is a schematic view explaining curvature radius, based on which an amount of an inner corner process performed on an inner corner of a design data is determined, according to an embodiment of the present invention.

An amount of the outer corner rounding process may be determined based on the curvature radius Rout of the design data as shown in FIG. 7. An amount of the inner corner rounding process may be determined based on the curvature radius Rin of the design data as shown in FIG. 8.

The inspection data used for inspecting the gate pattern 1 is generated by performing a logical operation using the corner-processed first design data (D1) and the corner-processed second design data (D2) (step S3 in FIG. 1).

Figure 9:
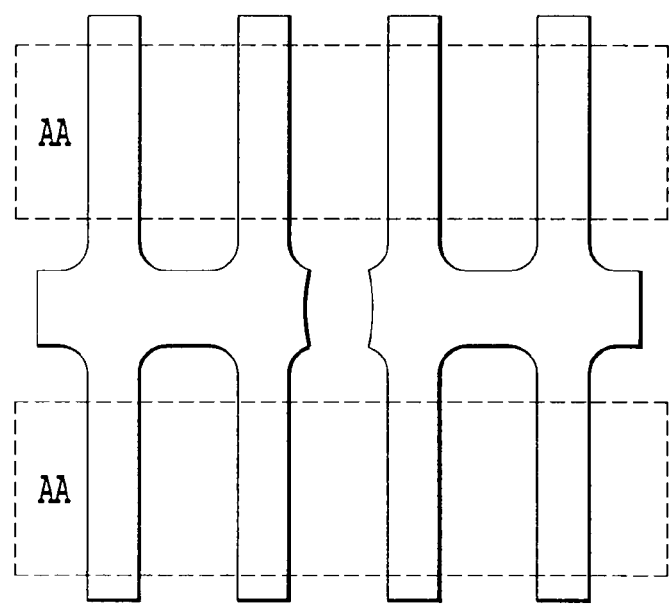
FIG. 9 is a plan view showing an inspection data generated in an inspection method according to an embodiment of the present invention.

FIG. 9 is a plan view showing the inspection data generated according to this embodiment of the present invention. In FIG. 9, active areas (AA) surrounded by dashed lines are regions that serve as diffusion layers. In this embodiment, to obtain the inspection data the logical operation is a difference or subtraction operation, in which the inspection data is obtained by subtracting the second design data region corresponding to the light transmitting region of the second mask pattern from the first design data region corresponding to the light shielding region of the first mask pattern, i.e. by subtracting the second design data D2 of FIG. 6 from the first design data D1 of FIG. 5.

According to the above-noted operation in the embodiment in the invention, the logical operation is performed after a corner processing is performed on each corner of the first and second design data, to thereby generate first and second corner-processed design data subjected to the corner processing. The first and second corner-processed design data is then utilized to generate inspection data to be compared with the gate pattern as shown in FIG. 2. That is, the gate pattern 1 shown in FIG. 2 is inspected, being compared to the inspection data of FIG. 9 in the Die to Database inspection method (step S4 in FIG. 1). The double exposure for forming the gate pattern 1 is performed using the first photomask and the second photomask (masks for double exposure) produced based on the first corner-processed design data and the second corner-processed design data, similarly to a background double exposure method.

As noted above, in the embodiment of the present invention the corner processing is initially performed on the first and second design data, and then the logical operation is performed. The applicants of the present invention recognized that by performing the corner processing prior to the logical operation certain rounded corner portions may be cut-off, and thereby a more accurate inspection data can be realized, in comparison with an inspection method in which a logical operation is initially performed on design data, and then subsequently a corner processing is performed, as now discussed below with respect to FIG. 10.

Figure 10:
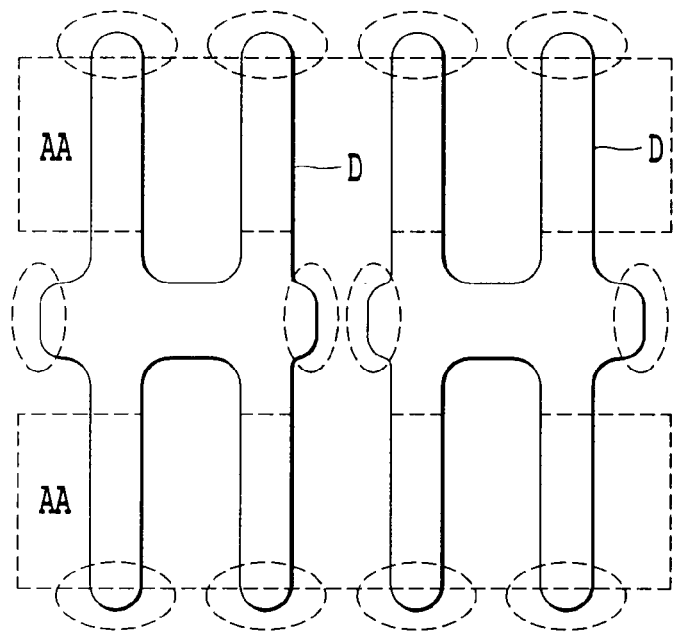
FIG. 10 is a plan view showing an inspection data generated in a background inspection method.

FIG. 10 is a plan view showing the inspection data generated in a background inspection method. In the background inspection method, an inspection data D is generated by the following two steps. In the first step, a pattern data is generated by performing a logical operation using a first design data and a second design data of mask patterns transferred by double exposure. In the second step, the inspection data D is generated by performing the corner process on each corner of the pattern data.

As a result of performing the corner process after performing the logical operation, in the background art of FIG. 10 the inspection data D has 12 corner regions, shown as surrounded by dashed lines in FIG. 10, in which there are significant differences in shapes between the inspection data D of FIG. 10 and the gate pattern 1 formed on the substrate in FIG. 2. In this inspection method using the inspection data D, an accurate inspection result may not be given as the gate pattern region (of FIG. 2) may actually have the proper shapes and sizes, but may not match the inspection data at the corner regions (since the inspection data at the corner regions is not accurate), and thereby the gate pattern region may incorrectly be determined to have some defects. Therefore, required accuracy of pattern inspection may not be obtained.

On the other hand, the inspection data in the embodiment in FIG. 9 is more accurate particularly at the corner regions, and thus has no regions prominently different in shapes and sizes from the gate pattern 1 in FIG. 2. Therefore, required accuracy of pattern inspection may be assured in this inspection method.

According to this embodiment of the present invention, by performing the corner process on the first design data and the second design data before the logical operation, depending on the amount of deformation between the mask patterns (the first mask pattern and the second mask pattern) and the transferred patterns of the mask patterns on the substrate, proper inspection data having no regions, particularly no corner regions, with inappropriate defects notably different from the inspection-object pattern can be generated. Thereby, reduction of pattern inspection accuracy can be prevented.

As the inspection result of step S4 of FIG. 1, if no defect is detected by comparing the inspection data of FIG. 9 to the inspection-object pattern (the gate pattern 1 of FIG. 2), the photomask or the mask pattern data can be employed as a mask or a pattern data used in a manufacturing semiconductor process. However, if defects are detected from the comparison of the inspection data to the inspection-object pattern, the photomask, the mask pattern data, and/or parameters of the manufacturing semiconductor process, particularly an etching process, in forming the inspection-object pattern on the substrate are/is corrected.

A double exposure is applied for forming an inspection-object pattern in this embodiment. However, the present invention is not at all limited to the double exposure, but multiple (more than double) exposure can be applied for forming the inspection-object pattern in a similar way.

The inspection-object pattern in this embodiment is the gate pattern, but other device patterns can be adopted as the inspection-object pattern in a similar way. As another example of the inspection-object pattern, a resist pattern formed on a resist layer on the substrate can be adopted, which is formed by transferring a first mask pattern and a second mask pattern on a same resist layer and processing a first transferred pattern of the first mask pattern and a second transferred pattern of the second mask pattern. When the mask patterns are transferred, a part of the first transferred pattern of the first mask pattern and a part of the second transferred pattern of the second mask pattern are overlapped with each other. Furthermore, a pattern formed on the layer on the substrate by etching the layer using the above resist pattern as a mask can also be used as the inspection-object pattern.

The difference or subtraction method is performed as the logical operation in this embodiment, but other methods can be used, which present the shapes of the pattern actually formed on the substrate by using the plural design data.

The corner rounding process is performed as the corner process in this embodiment, but other corner processes can be performed, for example a resizing process in which the pattern edges around the corners of the design data are shifted can be performed. What kind of corner process is performed on the design data is determined depending on the shape, size, or position of the inspection-object pattern and the design data.

The die to database method is applied in the inspection method according to this embodiment, but another inspection method can be applied in which the inspection-object pattern is compared to the inspection data.

The inspection data can be generated by using not only the design data of the device pattern but other data. The type of data used for generating the inspection data is determined based on what kind of process is applied for forming the inspection-object pattern and on what kind of inspection-object data is used as an inspection target. For example, when a resist pattern formed on a resist layer by a lithography process is used as the inspection-object pattern, the inspection data can be generated by using plural design data on the resist layer (lithography target data).

Additional advantages and modifications will readily occur to those skilled in the art. Therefore, the present invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A method of generating an inspection data used for inspecting an inspection-object pattern formed on a substrate, by a double exposure process in which the inspection-object pattern is formed by transferring a first mask pattern formed on a first mask and a second mask pattern formed on a second mask onto one layer on the substrate, a part of a first transferred pattern of the first mask pattern and a part of a second transferred pattern of the second mask pattern being overlapped on the layer, the method comprising:

performing, by a computer, a corner process on each corner of a first design data of the first mask pattern of a first exposure of the double exposure process to generate first corner-processed design data, and performing a corner process on each corner of a second design data of the second mask pattern of a second exposure of the double exposure process to generate second corner-processed design data;

generating, by a computer, the inspection data by performing a logical operation using the first corner-processed design data and the second corner-processed design data;

wherein the performing the logical operation is subtracting the second corner-processed design data corresponding to a light transmitting region of the second mask pattern from the first corner-processed design data corresponding to a light shielding region of the first mask pattern.

2. A method of generating an inspection data used for inspecting an inspection-object pattern formed on a substrate, by a double exposure process in which the inspection-object pattern is formed by transferring a first mask pattern formed on a first mask and a second mask pattern formed on a second mask onto one layer on the substrate, a part of a first transferred pattern of the first mask pattern and a part of a second transferred pattern of the second mask pattern being overlapped on the layer, the method comprising:

performing, by a computer, a corner process on each corner of a first design data of the first mask pattern of a first exposure of the double exposure process to generate first corner-processed design data, and performing a corner process on each corner of a second design data of the second mask pattern of a second exposure of the double exposure process to generate second corner-processed design data;

generating, by a computer, the inspection data by performing a logical operation using the first corner-processed design data and the second corner-processed design data;

wherein the corner process is a corner rounding process; and wherein an amount of the corner process is determined based on a curvature radius of each corner of the first and second design data.

3. The method according to claim 2, wherein the first photomask is an alternating phase shift mask.

4. The method according to claim 2, wherein the second photomask is a chromium mask or an attenuated phase shift mask.

5. An inspection method of an inspection-object pattern, comprising:

forming an inspection-object pattern on a substrate by a double exposure process including transferring a first mask pattern of a first exposure of the double exposure process formed on a first mask and a second mask pattern of a second exposure of the double exposure process formed on a second mask on one layer onto the substrate, a part of a first transferred pattern of the first mask pattern and a part of a second transferred pattern of the second mask pattern being overlapped on the layer;

performing, by a computer, a corner process on each corner of a first design data of the first mask pattern to generate first corner-processed design data, and performing a corner process on each corner of a second design data of the second mask pattern to generate corner-processed design data;

generating, by a computer, an inspection data by performing a logical operation using the first corner-processed design data and the second corner-processed design data; and comparing, by a computer, the inspection data to the inspection-object pattern formed on the substrate;

wherein the performing the logical operation includes subtracting the second corner-processed design data corresponding to a light transmitting region of the second mask pattern from the first corner-processed design data corresponding to a light shielding region of the first mask pattern.

6. An inspection method of an inspection-object pattern, comprising:

forming an inspection-object pattern on a substrate by a double exposure process including transferring a first mask pattern of a first exposure of the double exposure process formed on a first mask and a second mask pattern of a second exposure of the double exposure process formed on a second mask on one layer onto the substrate, a part of a first transferred pattern of the first mask pattern and a part of a second transferred pattern of the second mask pattern being overlapped on the layer;

performing, by a computer, a corner process on each corner of a first design data of the first mask pattern to generate first corner-processed design data, and performing a corner process on each corner of a second design data of the second mask pattern to generate corner-processed design data;

generating, by a computer, an inspection data by performing a logical operation using the first corner-processed design data and the second corner-processed design data; and comparing, by a computer, the inspection data to the inspection-object pattern formed on the substrate;

wherein the corner process is a corner rounding process; and wherein an amount of the corner process is determined based on a curvature radius of each corner of the first and second design data.

7. A non-transitory computer readable storage medium storing instructions of a computer program that causes a computer to perform a method of generating inspection data used to inspect an inspection-object pattern formed on a substrate by a double exposure process, in which the inspection-object pattern is formed by transferring a first mask pattern of a first exposure of the double exposure process formed on a first mask and a second mask pattern of a second exposure of the double exposure process formed on a second mask on one layer onto the substrate, a part of a first transferred pattern of the first mask pattern and a part of a second transferred pattern of the second mask pattern being overlapped on the layer, the computer performed method comprising:

performing a corner process on each corner of a first design data of the first mask pattern to generate first corner-processed design data, and performing a corner process on each corner of a second design data of the second mask pattern to generate second corner-processed design data; and generating the inspection data by performing a logical operation using the first corner-processed design data and the second corner-processed design data;

wherein the performing the logical operation includes subtracting the second corner-processed design data corresponding to a light transmitting region of the second mask pattern from the first corner-processed design data corresponding to a light shielding region of the first mask pattern.

8. A non-transitory computer readable storage medium storing instructions of a computer program that causes a computer to perform a method of generating inspection data used to inspect an inspection-object pattern formed on a substrate by a double exposure process, in which the inspection-object pattern is formed by transferring a first mask pattern of a first exposure of the double exposure process formed on a first mask and a second mask pattern of a second exposure of the double exposure process formed on a second mask on one layer onto the substrate, a part of a first transferred pattern of the first mask pattern and a part of a second transferred pattern of the second mask pattern being overlapped on the layer, the computer performed method comprising:

performing a corner process on each corner of a first design data of the first mask pattern to generate first corner-processed design data, and performing a corner process on each corner of a second design data of the second mask pattern to generate second corner-processed design data; and generating the inspection data by performing a logical operation using the first corner-processed design data and the second corner-processed design data;

wherein the corner process is a corner rounding process; and wherein an amount of the corner process is determined based on a curvature radius of each corner of the first and second design data.

\* \* \* \* \*